(12) United States Patent
Okazaki et al.

(10) Patent No.: US 7,876,339 B2
(45) Date of Patent: Jan. 25, 2011

(54) MULTI-PRIMARY COLOR DISPLAY DEVICE AND LIQUID CRYSTAL DISPLAY DEVICE

(75) Inventors: Shoji Okazaki, Kameyama (JP);
Yoshihiro Okada, Minamiashigara (JP);
Kenji Nakamura, Chiryu (JP); Kozo Nakamura, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 441 days.

(21) Appl. No.: 11/573,752

(22) PCT Filed: Aug. 10, 2005

(86) PCT No.: PCT/JP2005/014673
§ 371 (c)(1),
(2), (4) Date: Sep. 10, 2008

(87) PCT Pub. No.: WO2006/019025
PCT Pub. Date: Feb. 23, 2006

(65) Prior Publication Data
US 2008/0316235 A1 Dec. 25, 2008

(30) Foreign Application Priority Data
Aug. 19, 2004 (JP) .............................. 2004-240021

(51) Int. Cl.
*G09G 5/02* (2006.01)
*G09G 3/36* (2006.01)
(52) U.S. Cl. ........................................ 345/694; 345/88
(58) Field of Classification Search ................ 345/589, 345/581, 599, 690, 694; 349/104, 108, 144; 348/790
See application file for complete search history.

(56) References Cited

U.S. PATENT DOCUMENTS

| 4,800,375 | A | | 1/1989 | Silverstein et al. |
| 4,953,953 | A | * | 9/1990 | Fergason ..................... 349/79 |
| 6,570,584 | B1 | * | 5/2003 | Cok et al. ................... 345/690 |
| 7,113,231 | B2 | * | 9/2006 | Conner et al. ................. 349/5 |
| 7,167,150 | B2 | * | 1/2007 | Yang et al. ................... 345/89 |

(Continued)

FOREIGN PATENT DOCUMENTS

JP 61-241779 A 10/1986

(Continued)

OTHER PUBLICATIONS

Official communication issued in the corresponding International Application No. PCT/JP2005/014673, mailed on Nov. 22, 2005.

(Continued)

*Primary Examiner*—Kevin M Nguyen
(74) *Attorney, Agent, or Firm*—Keating & Bennett, LLP

(57) ABSTRACT

A display device which exhibits functional effects in which color separation between sub-pixels constituting a pixel is hardly recognized and white line display is easily recognized as one line, in enlargement of the color reproduction range in image display using multi-primary colors, and thereby improves display quality, and provides a liquid crystal display device including such a display device. The display device displays an image constituted by pixels each including sub-pixels of four or more colors, wherein the pixels constituting the display device mainly include a pixel arranging a sub-pixel of a color having the highest brightness value in a central region of the pixel.

12 Claims, 21 Drawing Sheets

U.S. PATENT DOCUMENTS

| | | | |
|---|---|---|---|
| 7,268,757 B2 * | 9/2007 | Ben-David et al. | 345/88 |
| 7,492,379 B2 * | 2/2009 | Credelle et al. | 345/695 |
| 7,495,722 B2 * | 2/2009 | Roth et al. | 349/106 |
| 2002/0024618 A1 | 2/2002 | Imai | |
| 2004/0046725 A1 | 3/2004 | Lee | |
| 2004/0095521 A1 | 5/2004 | Song et al. | |
| 2004/0169807 A1 | 9/2004 | Rho et al. | |
| 2005/0134785 A1 | 6/2005 | Roth et al. | |
| 2005/0162600 A1 | 7/2005 | Rho et al. | |
| 2005/0264587 A1 | 12/2005 | Kurumisawa | |
| 2006/0098033 A1 * | 5/2006 | Langendijk | 345/694 |
| 2007/0091043 A1 | 4/2007 | Rho et al. | |

FOREIGN PATENT DOCUMENTS

| | | |
|---|---|---|
| JP | 05-143005 A | 6/1993 |
| JP | 09-251160 A | 9/1997 |
| JP | 10-307205 A | 11/1998 |
| JP | 11-295717 A | 10/1999 |
| JP | 2000-330522 A | 11/2000 |
| JP | 2000-330523 A | 11/2000 |
| JP | 2001-209047 A | 8/2001 |
| JP | 2001-306023 A | 11/2001 |
| JP | 2002-72980 A | 3/2002 |
| JP | 02/101644 A2 | 12/2002 |
| JP | 2004-078218 A | 3/2004 |
| JP | 2004-102292 A | 4/2004 |
| JP | 2005-62833 A | 3/2005 |
| JP | 2005-084168 A | 3/2005 |
| JP | 2005-523465 A | 8/2005 |
| JP | 2007-518117 A | 7/2007 |
| WO | 03/088203 A1 | 10/2003 |
| WO | 2005/057532 A2 | 6/2005 |

OTHER PUBLICATIONS

SID sokuhou, online, May 26, 2004, Nikkei Business Publications, Inc., URL:http://ne.nikkeibp.co.jp/members/NEWS/20040526/103584.

* cited by examiner

Fig.1

| 1 | 2 | 3 | 4 | 1 | 2 | 3 | 5 |
|---|---|---|---|---|---|---|---|
| 1 | 2 | 3 | 5 | 1 | 2 | 3 | 4 |

Fig.2-1

| R | Y | G | B | R | Y | C | B |
|---|---|---|---|---|---|---|---|
| R | Y | C | B | R | Y | G | B |
| R | Y | G | B | R | Y | C | B |
| R | Y | C | B | R | Y | G | B |

Fig.2-2

| R | Y | G | C | B | Y | G | C |
|---|---|---|---|---|---|---|---|
| B | Y | G | C | R | Y | G | C |
| R | Y | G | C | B | Y | G | C |
| B | Y | G | C | R | Y | G | C |

Fig.2-3

| R | G | Y | B | R | G | C | B |
|---|---|---|---|---|---|---|---|
| R | G | C | B | R | G | Y | B |
| R | G | Y | B | R | G | C | B |
| R | G | C | B | R | G | Y | B |

Fig.4

| 1 | 2 | 3 | 1 | 2 | 4 |
|---|---|---|---|---|---|
| 1 | 2 | 4 | 1 | 2 | 3 |

Fig.5-1

| R | Y | G | B | Y | G |
|---|---|---|---|---|---|
| B | Y | G | R | Y | G |
| R | Y | G | B | Y | G |
| B | Y | G | R | Y | G |

Fig.5-2

| R | Y | B | G | Y | B |
|---|---|---|---|---|---|
| G | Y | B | R | Y | B |
| R | Y | B | G | Y | B |
| G | Y | B | R | Y | B |

Fig.5-3

| R | Y | G | R | Y | B |
|---|---|---|---|---|---|
| R | Y | B | R | Y | G |
| R | Y | G | R | Y | B |
| R | Y | B | R | Y | G |

Fig.6-1

| 1 | 2 | 1 | 2 |
|---|---|---|---|
| 3 | 4 | 3 | 5 |
| 1 | 2 | 1 | 2 |
| 3 | 5 | 3 | 4 |

Fig.6-2

| 1 | 2 | 1 | 2 |
|---|---|---|---|
| 3 | 4 | 3 | 5 |
| 1 | 2 | 1 | 2 |
| 3 | 4 | 3 | 5 |

Fig.7-1

| R | Y | R | Y | R | Y | R | Y |
|---|---|---|---|---|---|---|---|
| G | B | C | B | G | B | C | B |
| R | Y | R | Y | R | Y | R | Y |
| C | B | G | B | C | B | G | B |
| R | Y | R | Y | R | Y | R | Y |
| G | B | C | B | G | B | C | B |
| R | Y | R | Y | R | Y | R | Y |
| C | B | G | B | C | B | G | B |

Fig.7-2

| R | Y | R | Y | R | Y | R | Y |
|---|---|---|---|---|---|---|---|
| G | C | B | C | G | C | B | C |
| R | Y | R | Y | R | Y | R | Y |
| B | C | G | C | B | C | G | C |
| R | Y | R | Y | R | Y | R | Y |
| G | C | B | C | G | C | B | C |
| R | Y | R | Y | R | Y | R | Y |
| B | C | G | C | B | C | G | C |

Fig.7-3

| R | G | R | G | R | G | R | G |
|---|---|---|---|---|---|---|---|
| B | C | B | Y | B | C | B | Y |
| R | G | R | G | R | G | R | G |
| B | C | B | Y | B | C | B | Y |
| R | G | R | G | R | G | R | G |
| B | C | B | Y | B | C | B | Y |
| R | G | R | G | R | G | R | G |
| B | C | B | Y | B | C | B | Y |

Fig.7-4

| R | Y | R | Y | R | Y | R | Y |
|---|---|---|---|---|---|---|---|
| G | B | C | B | G | B | C | B |
| R | Y | R | Y | R | Y | R | Y |
| G | B | C | B | G | B | C | B |
| R | Y | R | Y | R | Y | R | Y |
| G | B | C | B | G | B | C | B |
| R | Y | R | Y | R | Y | R | Y |
| G | B | C | B | G | B | C | B |

Fig.7-5

| R | Y | R | Y | R | Y | R | Y |
|---|---|---|---|---|---|---|---|
| G | C | G | C | G | C | G | C |
| R | Y | R | Y | R | Y | R | Y |
| B | C | B | C | B | C | B | C |
| R | Y | R | Y | R | Y | R | Y |
| G | C | G | C | G | C | G | C |
| R | Y | R | Y | R | Y | R | Y |
| B | C | B | C | B | C | B | C |

Fig.7-6

| R | Y | R | Y | R | Y | R | Y |
|---|---|---|---|---|---|---|---|
| G | B | G | B | G | B | G | B |
| R | Y | R | Y | R | Y | R | Y |
| C | B | C | B | C | B | C | B |
| R | Y | R | Y | R | Y | R | Y |
| G | B | G | B | G | B | G | B |
| R | Y | R | Y | R | Y | R | Y |
| C | B | C | B | C | B | C | B |

Fig.7-7

| R | G | R | G | R | G | R | G |
|---|---|---|---|---|---|---|---|
| B | Y | B | C | B | Y | B | C |
| R | G | R | G | R | G | R | G |
| B | Y | B | C | B | Y | B | C |
| R | G | R | G | R | G | R | G |
| B | Y | B | C | B | Y | B | C |
| R | G | R | G | R | G | R | G |
| B | Y | B | C | B | Y | B | C |

Fig.8

| 1 | 2 | 3 | 4 | 5 | 1 | 2 | 3 | 4 | 6 |
|---|---|---|---|---|---|---|---|---|---|
| 1 | 2 | 3 | 4 | 6 | 1 | 2 | 3 | 4 | 5 |

Fig.9-3

| R | Y | G | C | B | R | Y | G | C | M |
|---|---|---|---|---|---|---|---|---|---|
| R | Y | G | C | M | R | Y | G | C | B |
| R | Y | G | C | B | R | Y | G | C | M |
| R | Y | G | C | M | R | Y | G | C | B |

Fig.10-1

| 1 | 2 | 3 | 4 | 1 | 2 | 3 | 5 | 1 | 2 | 3 | 6 |
|---|---|---|---|---|---|---|---|---|---|---|---|
| 1 | 2 | 3 | 5 | 1 | 2 | 3 | 6 | 1 | 2 | 3 | 4 |
| 1 | 2 | 3 | 6 | 1 | 2 | 3 | 4 | 1 | 2 | 3 | 5 |

Fig.10-2

| 1 | 2 | 3 | 4 | 1 | 2 | 3 | 4 | 1 | 2 | 3 | 4 |
|---|---|---|---|---|---|---|---|---|---|---|---|
| 1 | 2 | 3 | 5 | 1 | 2 | 3 | 5 | 1 | 2 | 3 | 5 |
| 1 | 2 | 3 | 6 | 1 | 2 | 3 | 6 | 1 | 2 | 3 | 6 |

Fig.10-3

| 1 | 2 | 3 | 4 | 1 | 2 | 3 | 5 | 1 | 2 | 3 | 6 |
|---|---|---|---|---|---|---|---|---|---|---|---|
| 1 | 2 | 3 | 4 | 1 | 2 | 3 | 5 | 1 | 2 | 3 | 6 |
| 1 | 2 | 3 | 4 | 1 | 2 | 3 | 5 | 1 | 2 | 3 | 6 |

Fig.11-1

| R | Y | G | B | C | Y | G | B | M | Y | G | B |
|---|---|---|---|---|---|---|---|---|---|---|---|
| M | Y | G | B | R | Y | G | B | C | Y | G | B |
| C | Y | G | B | M | Y | G | B | R | Y | G | B |

Fig.11-2

| R | G | B | C | R | G | B | Y | R | G | B | M |
|---|---|---|---|---|---|---|---|---|---|---|---|
| R | G | B | M | R | G | B | C | R | G | B | Y |
| R | G | B | Y | R | G | B | M | R | G | B | C |

Fig.12-1

| 1 | 2 | 1 | 2 | 1 | 2 |
|---|---|---|---|---|---|
| 3 | 4 | 3 | 6 | 3 | 5 |
| 1 | 2 | 1 | 2 | 1 | 2 |
| 3 | 5 | 3 | 4 | 3 | 6 |
| 1 | 2 | 1 | 2 | 1 | 2 |
| 3 | 6 | 3 | 5 | 3 | 4 |

Fig.12-2

| 1 | 2 | 1 | 2 | 1 | 2 |
|---|---|---|---|---|---|
| 3 | 4 | 3 | 4 | 3 | 4 |
| 1 | 2 | 1 | 2 | 1 | 2 |
| 3 | 5 | 3 | 5 | 3 | 5 |
| 1 | 2 | 1 | 2 | 1 | 2 |
| 3 | 6 | 3 | 6 | 3 | 6 |

Fig.13-1

| R | G | R | G | R | G |
|---|---|---|---|---|---|
| B | C | B | Y | B | M |
| R | G | R | G | R | G |
| B | M | B | C | B | Y |
| R | G | R | G | R | G |
| B | Y | B | M | B | C |

Fig.13-2

| R | G | C | G | M | G |
|---|---|---|---|---|---|
| B | Y | B | Y | B | Y |
| M | G | R | G | C | G |
| B | Y | B | Y | B | Y |
| C | G | M | G | R | G |
| B | Y | B | Y | B | Y |

Fig.13-3

| R | G | M | G | B | G |
|---|---|---|---|---|---|
| C | Y | C | Y | C | Y |
| B | G | R | G | M | G |
| C | Y | C | Y | C | Y |
| M | G | B | G | R | G |
| C | Y | C | Y | C | Y |

Fig.13-4

| R | Y | C | Y | G | Y |
|---|---|---|---|---|---|
| M | B | M | B | M | B |
| G | Y | R | Y | C | Y |
| M | B | M | B | M | B |
| C | Y | G | Y | R | Y |
| M | B | M | B | M | B |

MULTI-PRIMARY COLOR DISPLAY DEVICE AND LIQUID CRYSTAL DISPLAY DEVICE

BACKGROUND OF THE INVENTION

1. Field of the Invention

The present invention relates to display devices and liquid crystal display devices each including a plurality of pixels constituting a display screen. More specifically, the present invention relates to a multi-primary color display device which can be used for various displays such as a liquid crystal TV, a PDP (Plasma Display Panel), an organic EL (Electroluminescent), and a FED (Field Emission Display) by constituting an image with multi-primary colors.

2. Description of the Related Art

As display devices, various displays forming an image by pixels have been widely used as means for displaying information or images. Display devices in which one pixel is constituted by sub-pixels of three colors of red (R), green (G), and blue (B) as shown in FIG. 14 and thereby color display is provided are common, for example. In such a color display technology, it has been recently considered that a color reproduction range is enlarged for improvement in display quality. For example, color purity of three primary colors of RGB is increased, and thereby the color reproduction range is enlarged in a chromaticity diagram. In this case, however, reduction in brightness is generated.

In addition, it has been impossible in principle that a color other than the combination of these three primary colors is expressed. It is needed in order to express a color without the region formed by three tops in the CIE (Commission Internationale ed I'Eclairage) 1931 Chromaticity Diagram, that is, a color without RGB triangle, that the region of the RGB triangle is enlarged, or/and, a color without this triangle region is used. Additionally, a method of using a color within a (polygonal) region (for example, W) is mentioned as a method of compensating brightness with enlarging the color reproduction range.

A technology for enlarging the region in the chromaticity diagram by increasing the number of the primary colors to four, five, six, and the like, using a new color other than the three primary colors has been developed. See, for example, "SID sokuhou", "online", May 26, 2004, Nikkei Business Publications, Inc. "search on Aug. 18, 2004", Internet URL: http://ne.nikkeibp.co.jp/members/NEWS/20040526/103584/ (Nonpatent Document 1). Another method discloses a liquid crystal display device in which each pixel of red, blue, green, and white is arranged in the row direction, and in the column direction, pixels with the same color are arranged, for example. See, for example, pages 1, 2, and 22 in Japanese Kokai Publication No. 2004-102292 (Patent Document 1). In this liquid crystal display device, a method of adding W to the RGB three primary colors, thereby improving the brightness and the color reproduction range is proposed. Two color arrays of stripe array and matrix array have been proposed. The stripe array is commonly adopted in application of large displays such as TV, because of matching property with images. FIG. 15 shows an embodiment of this stripe array in this liquid crystal display device. In this case, R, G, B, and W are arranged in this order to form one pixel. In such a multi-primary color display, design that is advantageous in terms of the color reproduction range can be permitted, and the color reproduction range is enlarged without increasing the color purity. Therefore, in this respect, the brightness is not reduced. However, the number of data increases depending on the division number only by dividing one pixel into the number of the primary colors, and the number of a data driver or an opening ratio is not enough. Therefore, in this respect, there is room for improvement. In addition, a liquid crystal display device in which a fine filter forming a color filter has four colors corresponding to a R-G axis and a B-Y axis is disclosed. See, for example, pages 1, 2, and 6 in Japanese Kokai Publication No. 2001-209047 (Patent Document 2). However, also in this liquid crystal display device, there is room for improvement for eliminating demerits associated with the multi-primary colors.

With respect to a liquid crystal display device performing color display using sub-pixels of at least four primary colors, it is disclosed that five primary colors of RGYBC are arranged as four sub-pixels of RGYB, CRGY, BCRG, YBCR, or GYBC. See, for example, pages 1, 2, and 9 in the Drawings of WO 02/101644 (Patent Document 3). However, in this liquid crystal display device, the five primary colors are simply arranged in the sub-pixels by rotation when display is provided by four sub-pixels using five primary colors of RGYBC. In such an arrangement pattern, reduction in effectual resolution or visual problems may be generated. A large screen display device comprising five different magnetic reversal elements for four color display and adopting a four-color combination of displayable colors among red, green, blue, white, and back is disclosed. See, for example, page 1 in Japanese Kokai Publication No. Hei-05-143005 (Patent Document 4). Also in this display device, any four colors among the five colors are combined, and improvement in display quality is need. Therefore, there is room for improvement in order to further enhance basic performances in displays such as a liquid crystal TV for which excellent display quality is needed with exhibiting properties such as high color reproduction range and high brightness.

SUMMARY OF THE INVENTION

The present invention has been made in view of the above-mentioned state of the art. The present invention has an object to provide a display device which achieves high color reproduction range and high brightness for enlarging the color reproduction range in image display using multi-primary colors, in addition to suppression of increase in the number of data and decrease in aperture ratio, and to provide a liquid crystal display device comprising such a display device.

The present inventors have made various investigations on enlargement of the color reproduction range of display devices. The inventors noted that it is effective for achievement of enlargement of the color reproduction range of the display devices and high brightness to increase the number of sub-pixels constituting one pixel using four or more multi-primary colors. The inventors also noted that if the number of division (m) of the sub-pixels is smaller than the number of the primary colors (n), increase in the number of data and decrease in aperture ratio can be suppressed. The inventors found that in this case, if sub-pixels of (n−m+1) colors among the n colors are included in one out of every (n−m+1) pixels, visual problems can be reduced and a display device excellent in display quality can be provided. As a result, the above-mentioned problems have been admirably solved, leading to completion of the present invention.

That is, the present invention is a display device displaying an image constituted by pixels each including sub-pixels of primary colors of n colors (n representing an integer of 4 or more), wherein each of the pixels includes sub-pixels of m colors (m representing an integer of 3 or more, m<n), and sub-pixels of (n−m+1) colors among the n colors are included in one out of every (n−m+1) pixels. In the present description, the terms "or more" and "or less" mean that the value described is included.

In the present invention, preferable embodiments of the pixels constituting the above-mentioned display device include: an embodiment (1) in which sub-pixels of (n−m+1) colors having a small brightness ratio and/or a small difference in brightness among the n colors are included in one out of every (n−m+1) pixels; an embodiment (2) in which the pixels mainly include a pixel including a yellow (Y) sub-pixel; an embodiment (3) in which the pixels mainly include a pixel including a red (R) sub-pixel; an embodiment (4) in which a sub-pixel of a color having a brightness closest to an average brightness in the pixel among the n colors is included in one out of every (n−m+1) pixels; and an embodiment in which these embodiments are combined. Every sub-pixel color arrangement (array) pattern in these embodiments is effective for reducing visual difference between the pixels.

In the above-mentioned embodiment (1), the level of the brightness in the sub-pixel of each color is noted and the brightness between the pixels can be uniformized.

In the above-mentioned embodiment (2), it is noted that the yellow (Y) sub-pixel has a brightness higher than that of the sub-pixels of the other colors. The configuration of the present invention is provided without thinning the yellow (Y) sub-pixel from the pixels, which can reduce brightness in white display. In order to more sufficiently obtain the effect of preventing decrease in brightness in white display in the above-mentioned embodiment (2), it is more preferable that the pixels constituting the above-mentioned display device are constituted by only a pixel containing a yellow (Y) sub-pixel. In the above-mentioned embodiment (2), it is preferable that the yellow (Y) sub-pixel is arranged in a central region of the pixel. For example, in a five-primary color display device in which each pixel consists of sub-pixels of four colors and five primary colors of R, Y, G, C, and B are used, it is visually preferable that Y having the highest brightness value among R, Y, G, C, and B is arranged in one of two central regions of the pixel, and G having the second-highest brightness value is arranged in the other central region.

In the above-mentioned embodiment (3), visual characteristics of the red (R) sub-pixel are noted. The configuration of the present invention is provided without thinning the red (R) sub-pixel from the pixels, which can reduce visual difference between the pixels in red display. That is, if the red (R) sub-pixel is thinned from the pixels, the brightness in red display is reduced, resulting in dull red display. However, if the blue (B) sub-pixel is thinned from the pixels, the brightness is reduced in blue display, but such slight reduction in brightness is not recognized as color change by human eyes. Similarly, if the green (G) sub-pixel is thinned from the pixels, the brightness is reduced, but the green display is recognized as bright display by human eyes even in such slight reduction in brightness.

In the above-mentioned embodiment (4), a relationship between the average brightness in the pixel and the level of the brightness of the sub-pixel of each color is noted. The configuration of the present invention is provided by thinning a sub-pixel having a brightness closest to an average brightness in the pixel, which can uniformize the brightness between the pixels. The average brightness in the pixel in the display device using sub-pixels of n-colors can be measured from the following formula:

Average brightness in pixel=(a total of brightness of sub-pixels of $n$ colors)/the number of sub-pixels included in one pixel The stripe array and the matrix array are mentioned as a sub-pixel array method in such a display device. The stripe array is preferable because of reduction in drive frequency if the display device is actually used for liquid crystal TVs and the like. That is, it is preferable that the sub-pixels constituting the pixel are arranged in a stripe pattern.

It is preferable that the above-mentioned display device is constituted by (n−m+1) or more different pixels, and the arrangement form of such pixels preferably is a lattice pattern. That is, the above-mentioned display device is preferably configured to have (n−m+1) or more different sub-pixel arrays arranged in a lattice pattern. As a result, display (visual) irregularity can be more suppressed, which permits more improvement in visual quality.

The number of the primary colors in the above-mentioned display device is preferably, four, five, six, and the like. If five primary colors are used, display is preferably performed using red (R), green (G), blue (B), yellow (Y), and cyan (C). In this case, the above-mentioned display device displays an image using five primary colors of red (R), green (G), blue (B), yellow (Y), and cyan (C), and each of the pixels constituting the display device includes sub-pixels of four colors, and cyan (C) and green (G) are included in one out of every two pixels. As a result, one pixel includes sub-pixels of four colors, sub-pixels of two colors of cyan (C) and green (G) having a small brightness ratio and a small difference in brightness are included in one out of every two sub-pixels. Such a sub-pixel arrangement pattern makes it possible to suppress increase in the number of data and decrease in aperture ratio with enlarging the color reproduction range and to reduce visual problems. As a result, display with high quality can be performed.

It is preferable that a pixel including cyan (C) and a pixel including green (G) are adjacently arranged. It is also preferable that each of the pixels constituting the display device includes sub-pixels arranged in a stripe pattern in order of red (R), yellow (Y), cyan (C), blue (B), or in order of red (R), yellow (Y), green (G), blue (B). These display devices have more improved display quality and can more sufficiently exhibit the functional effects of the present invention.

A liquid crystal display device including the above-mentioned display device can enlarge the color reproduction range and have basic performances excellent in brightness or display quality, and therefore can be preferably applied for liquid crystal TVs and the like, as a liquid crystal display. Each of the display device and the liquid crystal display device of the present invention essentially has the above-mentioned configuration and includes components which display devices generally include. Other configurations are not especially limited.

The display device of the present invention has the above-mentioned configuration. Such a display device can achieve high color reproduction range and high brightness for enlarging the color reproduction range in image display using multi-primary colors, in addition to suppression of increase in the number of data and decrease in aperture ratio. Such a display device also can reduce visual problems, and therefore, can be preferably applied for various displays such as liquid crystal TVs and the like, as a multi-primary color display device.

BRIEF DESCRIPTION OF DRAWINGS

FIG. 1 shows pixels constituting a five-primary color (RGBYC) display device in accordance with one embodiment of the present invention, and is a schematic view showing an array of four sub-pixels constituting one pixel.

FIG. 2-1 shows pixels constituting a five-primary color (RGBYC) display device in accordance with one embodiment of the present invention (configuration 5; the combination of G and C), and is a schematic view showing an array of four sub-pixels (RYGB or RYCB) constituting one pixel.

FIG. 2-2 shows pixels constituting a five-primary color (RGBYC) display device in accordance with one embodiment of the present invention (configuration 4; the combination of R and B), and is a schematic view showing an array of four sub-pixels (YGCR or YGCB) constituting one pixel.

FIG. 2-3 shows pixels constituting a five-primary color (RGBYC) display device in accordance with one embodiment of the present invention (configuration 6; the combination of Y and C), and is a schematic view showing an array of four sub-pixels (RGYB or RGCB) constituting one pixel.

FIG. 2-4 shows pixels constituting a five-primary color (RGBYC) display device in accordance with one embodiment of the present invention (configuration 7; the combination of R and C), and is a schematic view showing an array of four sub-pixels (RYGB or CYGB) constituting one pixel.

FIG. 3 is a schematic view showing a substrate configuration in accordance with embodiments of the present invention.

FIG. 4 shows pixels constituting a four-primary color display device in accordance with one embodiment of the present invention, and is a schematic view showing a sub-pixel arrangement configuration in a display device in which one pixel is constituted by sub-pixels of three colors among R, G, B, and Y, and the three sub-pixels are arranged in a stripe pattern.

FIG. 5-1 shows pixels constituting a four-primary color (RGBY) display device in accordance with one embodiment of the present invention, and is a schematic view showing an embodiment in which three sub-pixels constituting one pixel are arranged in order of RYG or BYG.

FIG. 5-2 shows pixels constituting a four-primary color (RGBY) display device in accordance with one embodiment of the present invention, and is a schematic view showing an embodiment in which the three sub-pixels constituting one pixel are arranged in order of RYB or GYB.

FIG. 5-3 shows pixels constituting a four-primary color (RGBY) display device in accordance with one embodiment of the present invention, and is a schematic view showing an embodiment in which the three sub-pixels constituting one pixel are arranged in order of RYG or RYB.

FIG. 6-1 shows pixels constituting a five-primary color display device in accordance with one embodiment of the present invention, and is a schematic view showing one sub-pixel arrangement configuration in the display device in which one pixel is constituted by four sub-pixels among R, G, B, C, and Y, and the four sub-pixels are arranged in two rows and two columns.

FIG. 6-2 shows pixels constituting a five-primary color display device in accordance with one embodiment of the present invention, and is a schematic view showing one sub-pixel arrangement configuration in the display device in which one pixel is constituted by four sub-pixels among R, G, B, C, and Y, and the four sub-pixels are arranged in two rows and two columns.

FIG. 7-1 shows pixels constituting a five-primary color (RGBYC) display device in accordance with one embodiment of the present invention, and is a schematic view showing one embodiment in which four sub-pixels constituting one pixel are arranged in order of RYGB or RYCB.

FIG. 7-2 shows pixels constituting a five-primary color (RGBYC) display device in accordance with one embodiment of the present invention, and is a schematic view showing an embodiment in which the four sub-pixels constituting one pixel are arranged in order of RYGC or RYBC.

FIG. 7-3 shows pixels constituting a five-primary color (RGBYC) display device in accordance with one embodiment of the present invention, and is a schematic view showing an embodiment in which the four sub-pixels constituting one pixel are arranged in order of RGBC or RGBY.

FIG. 7-4 shows pixels constituting a five-primary color (RGBYC) display device in accordance with one embodiment of the present invention, and is a schematic view showing an embodiment in which the four sub-pixels constituting one pixel are arranged in order of RYGB or RYCB.

FIG. 7-5 shows pixels constituting a five-primary color (RGBYC) display device in accordance with one embodiment of the present invention, and is a schematic view showing an embodiment in which the four sub-pixels constituting one pixel are arranged in order of RYGC or RYBC.

FIG. 7-6 shows pixels constituting a five-primary color (RGBYC) display device in accordance with one embodiment of the present invention, and is a schematic view showing an embodiment in which the four sub-pixels constituting one pixel are arranged in order of RYGB or RYCB.

FIG. 7-7 shows pixels constituting a five-primary color (RGBYC) display device in accordance with one embodiment of the present invention, and is a schematic view showing an embodiment in which the four sub-pixels constituting one pixel are arranged in order of RYGB or RYCB.

FIG. 8 shows pixels constituting a six-primary color display device in accordance with one embodiment of the present invention, and is a schematic view showing an embodiment in which five sub-pixels are arranged in a stripe pattern.

FIG. 9-1 shows pixels constituting a six-primary color (RGBYCM) display device in accordance with one embodiment of the present invention, and is a schematic view showing an embodiment in which five sub-pixels constituting one pixel are arranged in order of RYGCB or MYGCB.

FIG. 9-2 shows pixels constituting a six-primary color (RGBYCM) display device in accordance with one embodiment of the present invention, and is a schematic view showing an embodiment in which the five sub-pixels constituting one pixel are arranged in order of RYGBM or RYCBM.

FIG. 9-3 shows pixels constituting a six-primary color (RGBYCM) display device in accordance with one embodiment of the present invention, and is a schematic view showing an embodiment in which the five sub-pixels constituting one pixel are arranged in order of RYGCB or RYGCM.

FIG. 10-1 shows pixels constituting a six-primary color display device in accordance with one embodiment of the present invention, and is a schematic view showing one sub-pixel arrangement configuration in the display device in which one sub-pixel is constituted by sub-pixels of four colors among R, Y, G, C, B, and M, and the four sub-pixels are arranged in a stripe pattern.

FIG. 10-2 shows pixels constituting a six-primary color display device in accordance with one embodiment of the present invention, and is a schematic view showing one sub-pixel arrangement configuration in the display device in which one sub-pixel is constituted by sub-pixels of four colors among R, Y, G, C, B, and M, and the four sub-pixels are arranged in a stripe pattern.

FIG. 10-3 shows pixels constituting a six-primary color display device in accordance with one embodiment of the present invention, and is a schematic view showing one sub-pixel arrangement configuration in the display device in which one sub-pixel is constituted by sub-pixels of four colors among R, Y, G, C, B, and M, and the four sub-pixels are arranged in a stripe pattern.

FIG. 11-1 shows pixels constituting a six-primary color (RGBYCM) display device in accordance with one embodiment of the present invention, and is a schematic view showing one embodiment in which four sub-pixels constituting one pixel are arranged in RYGB, CYGB, or MYGB.

FIG. 11-2 shows pixels constituting a six-primary color (RGBYCM) display device in accordance with one embodiment of the present invention, and is a schematic view showing one embodiment in which four sub-pixels constituting one pixel are arranged in RGBC, RGBY, or RGBM.

FIG. 11-3 shows pixels constituting a six-primary color (RGBYCM) display device in accordance with one embodiment of the present invention, and is a schematic view showing one embodiment in which four sub-pixels constituting one pixel are arranged in RYGC, MYGC, or BYGC.

FIG. 11-4 shows pixels constituting a six-primary color (RGBYCM) display device in accordance with one embodiment of the present invention, and is a schematic view showing one embodiment in which four sub-pixels constituting one pixel are arranged in RYBM, CYBM, or GYBM.

FIG. 11-5 shows pixels constituting a six-primary color (RGBYCM) display device in accordance with one embodiment of the present invention, and is a schematic view showing one embodiment in which four sub-pixels constituting one pixel are arranged in RGBC, RGBY, or RGBM.

FIG. 12-1 shows pixels constituting a six-primary color display device in accordance with one embodiment of the present invention, and is a schematic view showing one sub-pixel arrangement configuration in the display device in which one sub-pixel is constituted by sub-pixels of four colors among R, Y, G, C, B, and M, and the four sub-pixels are arranged in two rows and two columns.

FIG. 12-2 shows pixels constituting a six-primary color display device in accordance with one embodiment of the present invention, and is a schematic view showing one sub-pixel arrangement configuration in the display device in which one sub-pixel is constituted by sub-pixels of four colors among R, Y, G, C, B, and M, and the four sub-pixels are arranged in two rows and two columns.

FIG. 13-1 shows pixels constituting a six-primary color (RGBYCM) display device in accordance with one embodiment of the present invention, and is a schematic view showing one embodiment in which four sub-pixels constituting one pixel are arranged in RGBC, RGBY, or RGBM.

FIG. 13-2 shows pixels constituting a six-primary color (RGBYCM) display device in accordance with one embodiment of the present invention, and is a schematic view showing one embodiment in which the four sub-pixels constituting one pixel are arranged in RGBY, MGBY, or CGBY.

FIG. 13-3 shows pixels constituting a six-primary color (RGBYCM) display device in accordance with one embodiment of the present invention, and is a schematic view showing one embodiment in which the four sub-pixels constituting one pixel are arranged in RGCY, MGCY, or BGCY.

FIG. 13-4 shows pixels constituting a six-primary color (RGBYCM) display device in accordance with one embodiment of the present invention, and is a schematic view showing one embodiment in which the four sub-pixels constituting one pixel are arranged in RYMB, CYMB, or GYMB.

DETAILED DESCRIPTION OF THE PREFERRED EMBODIMENTS

The display device or the liquid crystal display device is mentioned in more detail below with reference to best modes for carrying out the invention, using drawings. However, the present invention is not limited to only these Embodiments.

Embodiment 1

In the present embodiment, a five-primary color display device in which sub-pixels of four colors are arranged in one pixel is mentioned.

Figures 1, 9:
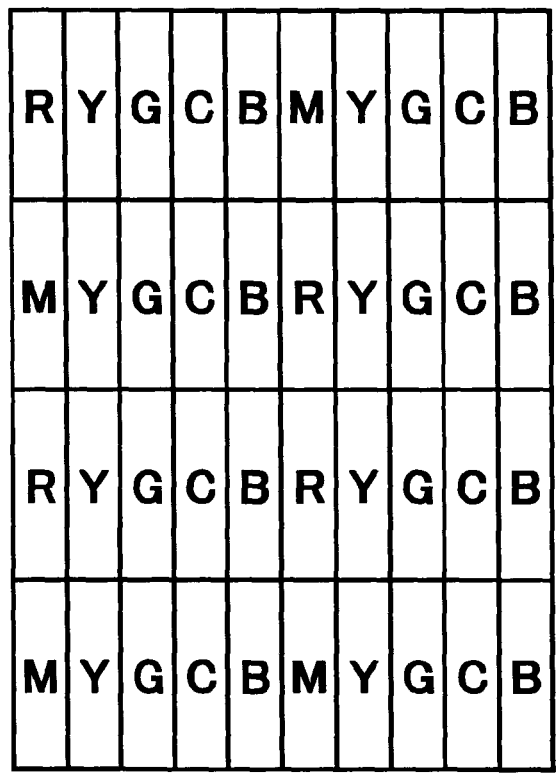
Figures 2, 9:
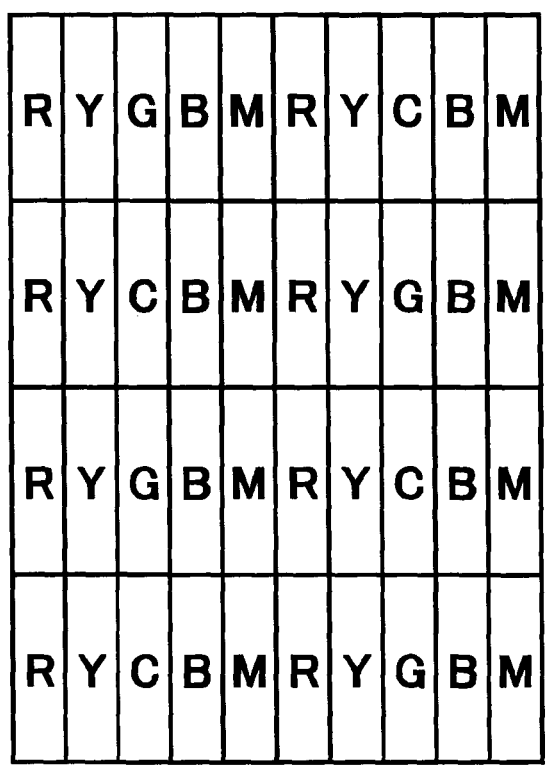

FIG. 1 shows pixels constituting a five-primary color display device in accordance with one embodiment of the present invention. Also, FIG. 1 is a schematic view showing an arrangement of the fourth or the fifth sub-pixels in the display device in which one pixel is constituted by sub-pixels of four colors among R, G, B, Y, and C, and the four sub-pixels are arranged in a stripe pattern. In FIG. 1, a repeating pattern of 2×2 pixels is shown and in one pixel, the sub-pixels are arranged in a stripe pattern.

The display device in accordance with one embodiment of the present invention performs display using primary colors of n colors. The sub-pixel arrangement pattern is configured in such a way that a selected combination of sub-pixels of (n−m+1) colors among the n colors is included in one out of every (n−m+1) pixels. In such a case, the sub-pixel arrangement pattern preferable includes: an embodiment (1) in which a combination of sub-pixels of (n−m+1) colors having the smallest brightness ratio and/or the smallest difference in brightness among primary colors of n colors is selected, and the combination is included in one out of every (n−m+1) pixels; an embodiment (2) in which the pixels mainly include a pixel including a yellow (Y) sub-pixel; an embodiment (3) in which the pixels mainly include a pixel including a red (R) sub-pixel; an embodiment (4) in which a sub-pixel of color having a brightness closest to an average brightness in the pixel, among the n colors, is included in one out of every (n−m+1) pixels; and an embodiment in which these embodiments are combined.

In the above-mentioned embodiment (1), it is preferable that a combination having both of a small brightness ratio and a small difference in brightness is selected. If there are two combinations having equivalent brightness ratios, for example, the combination having a smaller difference in brightness is preferably selected. In the present invention, it is preferable that a combination of sub-pixels of (n−m+1) colors having equivalent hues is included in one out of every (n−m+1) pixels.

In the above-mentioned embodiment (1) shown in FIG. 1, the fourth and the fifth sub-pixels has such an arrangement pattern that two colors having a small brightness ratio and/or a small difference in brightness are selected from five colors of R, G, B, Y, and C, and the combination is included in one out of every two pixels. The sub-pixel arrangement pattern is not especially limited, although the fourth or the fifth sub-pixel is arranged in an end of the pixel in FIG. 1. The preferable embodiments include an embodiment in which a sub-pixel of a color having the highest brightness value is arranged in a central region of the pixel. It is particularly preferable that the sub-pixels are arranged in descending order of the brightness value from a central region to an end region of the pixel.

As mentioned above, in the four or more multi-primary color display device (for example, liquid crystal display device), one pixel is constituted by a plurality of sub-pixels, and a visual difference may be generated depending on the color arrangement (array) pattern if the number of primary colors is larger than the number of the sub-pixels. However, as shown in the above-mentioned embodiment (1), the arrangement pattern on the basis of the level of the brightness makes it possible to achieve high color reproduction range and high brightness and to reduce visual problems. However, in sub-pixel arrangement patterns other than that in the present embodiment, a visual problem in that macular patterns appear in white display may be generated, for example.

In the present embodiment, it is preferable that all pixels constituting an image in the display device are constituted by a pixel satisfying the sub-pixel color arrangement pattern of the present embodiment. However, it is sufficient that the pixels constituting the image are mainly constituted by the pixel of the present embodiment. For example, substantially all or most of the pixels constituting the image are constituted by the pixel of the present embodiment. In this case, in the present embodiment in which each of the pixels constituting the display device using primary colors of n colors includes sub-pixels of m colors and sub-pixels of (n−m+1) colors among the n colors are included in one out of every (n−m+1) pixels, it is preferable that the sub-pixels of the other (m−1) colors among the n colors are included in substantially all of the pixels.

Hereinafter, a liquid crystal panel including a color filter actually formed therein was prepared and evaluated for lighting by eye observation.

Specifically, a display device using five primary colors of R, G, B, Y, and C shown in FIG. 1 was used. The brightness of sub-pixels is as shown in Table 1. The brightness of the sub-pixel can be measured from the normal direction of the substrate, with a viewing angle of 2° and a measurement area about 30 mm φ in the substrate normal direction, in a dark room, using a spectroradiometer SR-3 produced by TOPCON CORP.

Figures 2, 3, 4:
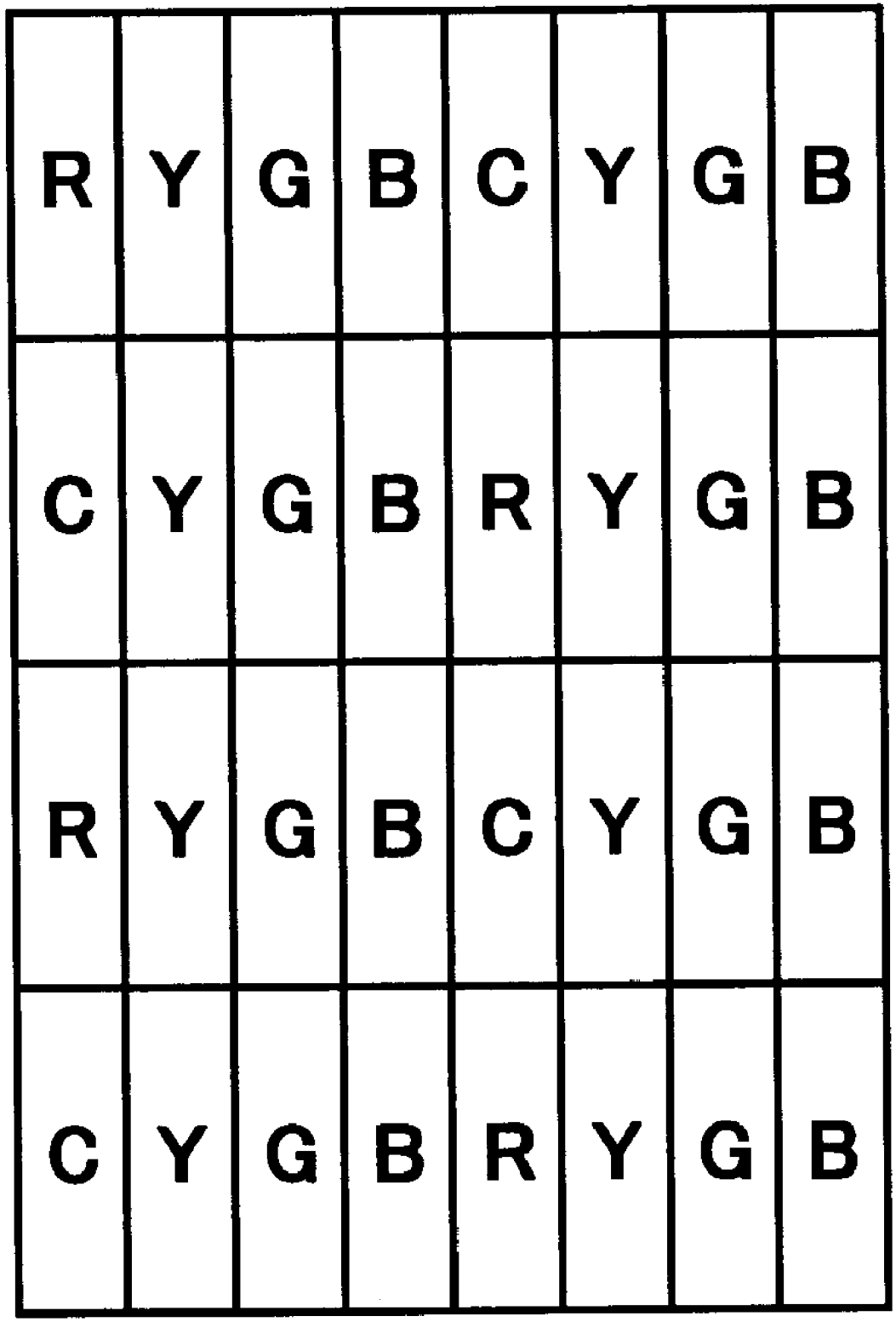
Figure 3:
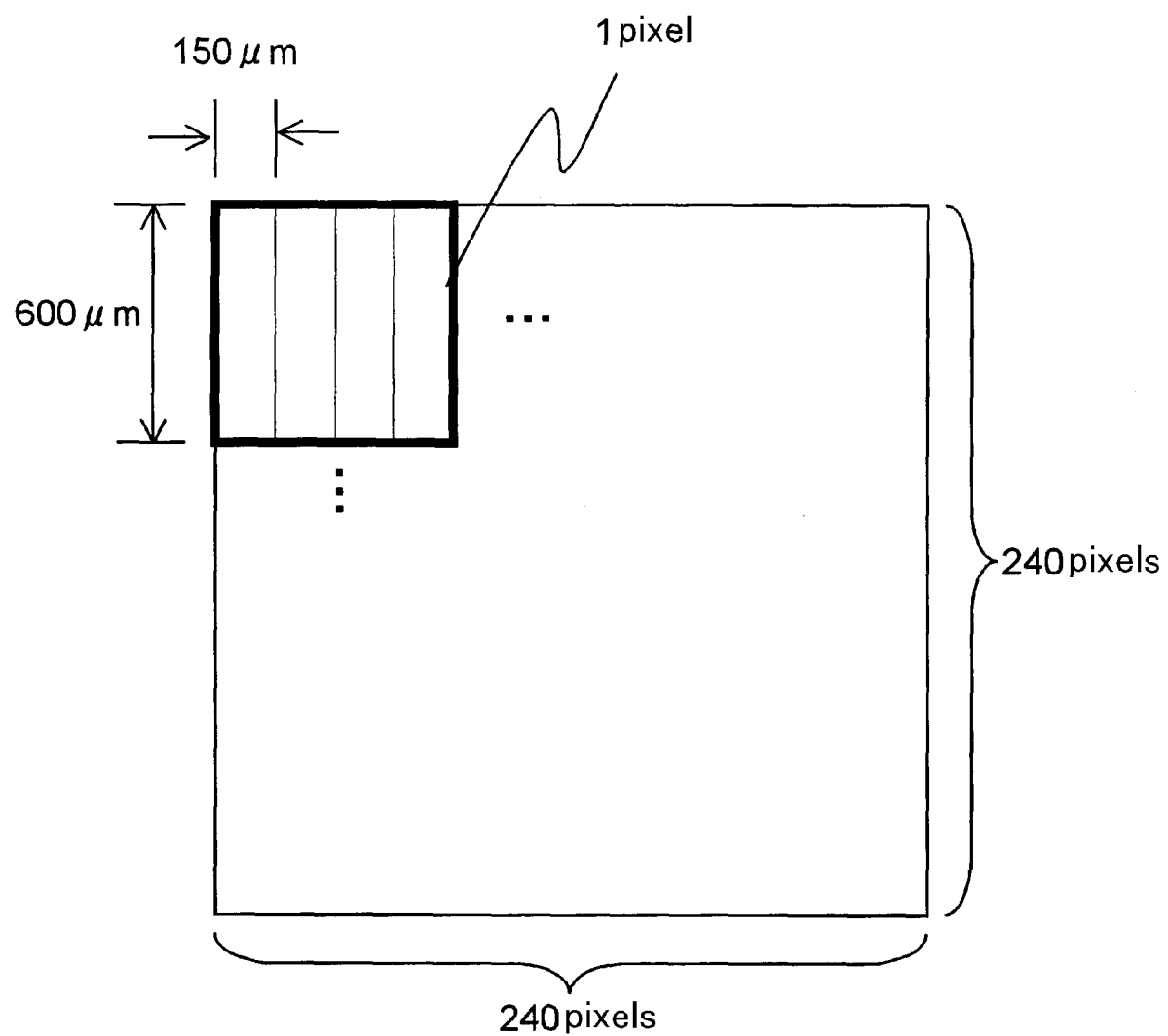

The present embodiment adopts a substrate constituted by 240×240 pixels each of which includes four sub-pixels having one side of 600 μm and the other side of 150 μm, as shown in FIG. 3.

TABLE 1

|  | R | G | B | C | Y |
|---|---|---|---|---|---|
| Brightness (cd/m²) | 30 | 70 | 20 | 60 | 160 |

Based on the results shown in the above Table 1, a pattern in which selected two colors (corresponding to 4 and 5 in FIG. 1) alternately included in the pixels and the other colors (corresponding to 1, 2, and 3 in FIG. 1) are arranged in all of the pixels was considered. Table 2 shows the results.

TABLE 2

| Configuration | Color 4 (or color 5) | Color 5 (or color 4) | Brightness ratio La/Lb | Difference in brightness La − Lb |
|---|---|---|---|---|
| 1 | C | B | 3.0 | 40 |
| 2 | G | B | 3.5 | 50 |
| 3 | Y | B | 8.0 | 140 |
| 4 | R | B | 1.5 | 10 |
| 5 | G | C | 1.2 | 10 |
| 6 | Y | C | 2.7 | 100 |
| 7 | R | C | 2.0 | 30 |
| 8 | Y | G | 2.3 | 90 |
| 9 | R | G | 2.3 | 40 |
| 10 | R | Y | 2.3 | 130 |

The color combination and the calculation results of La/Lb (brightness ratio) and La−Lb (difference in brightness) in the color combination show that there is a relation between the brightness ratio and the difference in brightness, and the visual quality. For example, the combination in the configuration 5 (the combination of G and C) shown in the above Table 2 showed the smallest brightness ratio and the smallest difference in brightness. Further, macular patterns were hardly observed and the configuration was visually the most excellent. In contrast, if Y and B were selected as the configuration having a large brightness ratio or a large difference in brightness, for example, the macular patterns were observed and the configuration was not visually preferable in comparison to the other configurations. Y has a remarkably higher brightness than that of the other colors, as shown in Table 1, and therefore, Y and another color never show the smallest brightness ratio and the smallest difference in brightness. Comparison of the configuration 8 with the configuration 9 shows that the configuration 9 having a smaller difference in brightness is visually more excellent even though the configurations 8 and 9 show equivalent brightness ratios.

In the configurations 1, 2, 4, 5, 7, and 9 in which the yellow (Y) sub-pixel was not thinned, the brightness in white display can be higher in comparison to the other configurations. In the configurations 1 to 3, 5, 6, and 8 in which the red (R) sub-pixel is not thinned, the red color in red display can be displayed more clearly in comparison to the other configurations.

Calculation of the average brightness in the pixel in the display device in accordance with the present embodiment from the brightness value shown in the above Table 1 gives 68 cd/m². Colors closest and second-closest to this value are G and C. In this respect, the configuration 5 in which G and C are thinned was visually the most excellent configuration.

FIGS. 2-1 to 2-4 show examples of visually excellent patterns in the above Table 2.

FIG. 2-1 is a schematic view showing an embodiment in which four sub-pixels constituting one pixel are arranged in order of RYGB or RYCB in the display device in accordance with the configuration 5 (the combination of G and C). In this display device, the array pixel of RYGB and the array pixel of RYCB are arranged alternately in row and column directions, i.e. in a lattice pattern. Y having the highest brightness value (Y value) among R, Y, G, C, and B is arranged in one of two central regions of the pixel and G having the second-highest brightness value is arranged in the other central region. In this configuration 5, the yellow (Y) and red (R) sub-pixels are not thinned, and G and C each having a brightness closest to the average brightness in the pixel are thinned.

FIG. 2-2 is a schematic view showing an embodiment in which four sub-pixels constituting one pixel are arranged in order of RYGC or BYGC in the display device in accordance with the configuration 4 (the combination of R and B). In this display device, the array pixel of RYGC and the array pixel of BYGC are arranged alternately in row and column directions, i.e. in a lattice pattern. Y having the highest brightness value (Y value) among R, Y, G, C, and B is arranged in one of two central regions of the pixel and G having the second-highest brightness is arranged in the other central region. In this configuration 4, the yellow (Y) sub-pixel is not thinned.

FIG. 2-3 is a schematic view showing an embodiment in which four sub-pixels constituting one pixel are arranged in order of RGYB or RGCB in the display device in accordance with the configuration 6 (the combination of Y and C). In this display device, the array pixel of RGYB and the array pixel of RGCB are arranged alternately in row and column directions i.e. in a lattice pattern. Y having the highest brightness value (Y value) among R, G, Y, C, and B is arranged in one of two central regions of the pixel and G having the second-highest brightness is arranged in the other central region. In FIG. 2-3, each pixel includes RGB, and therefore, display of a peculiar pattern (line of a primary color, and the like) equivalent to display in a conventional embodiment (FIG. 4) could be performed. In this configuration 6, the red (R) sub-pixel is not thinned.

FIG. 2-4 is a schematic view showing an embodiment in which four sub-pixels constituting one pixel are arranged in order of RYGB or CYGB in the display device in accordance with the configuration 7 (the combination of R and C). In this display device, the array pixel of RYGB and the array pixel of CYGB are arranged alternately in row and column directions i.e. in a lattice pattern. Y having the highest brightness value (Y value) among R, G, Y, C, and B is arranged in one of two central regions of the pixel and G having the second-highest brightness is arranged in the other central region. In this configuration 7, the yellow (Y) sub-pixel is not thinned.

As shown in these pattern examples, the visually excellent configuration can be provided by selecting, as the fourth and the fifth sub-pixels, (1) the combination of colors having a small brightness ratio and a small difference in brightness, (2) the combination of colors not including yellow (Y), (3) the combination of colors not including red (R), or (4) the combination having a brightness closest to the average brightness in the pixel. Further, two or more different pixels are arranged in a lattice pattern and the pixels are arranged in such a way that the pixels adjacent in row and column directions do not have the same sub-pixel arrays, and alternatively, with respect to the sub-pixel array in one pixel, the sub-pixel having a high brightness value is arranged in the central region of the pixel. As a result, it can be possible to further improve the display quality.

Embodiment 2

In the present embodiment, a four-primary color display device in which sub-pixels of three colors are arranged in one pixel is mentioned.

FIG. 4 shows pixels constituting a four-primary display device in accordance with one embodiment of the present invention. Also, FIG. 4 is a schematic view showing a sub-pixel arrangement configuration in the display device in which one pixel is constituted by sub-pixels of three colors among R, G, B, and Y, and the three sub-pixels are arranged in a stripe pattern. In FIG. 4, a repeating pattern of 2×2 pixels is shown and in one pixel, the sub-pixels are arranged in a stripe pattern. With respect to the brightness (cd/m$^2$) of the sub-pixel of each color, R is 30, G is 70, and B is 20, and Y is 160. The average brightness (cd/m$^2$) of the pixel is 70 and colors closest and second-closest to this value are G and R. The sub-pixel arrangement pattern is not especially limited, although the third or the fourth sub-pixel is arranged in an end of the pixel in FIG. 4.

Figures 3, 11:
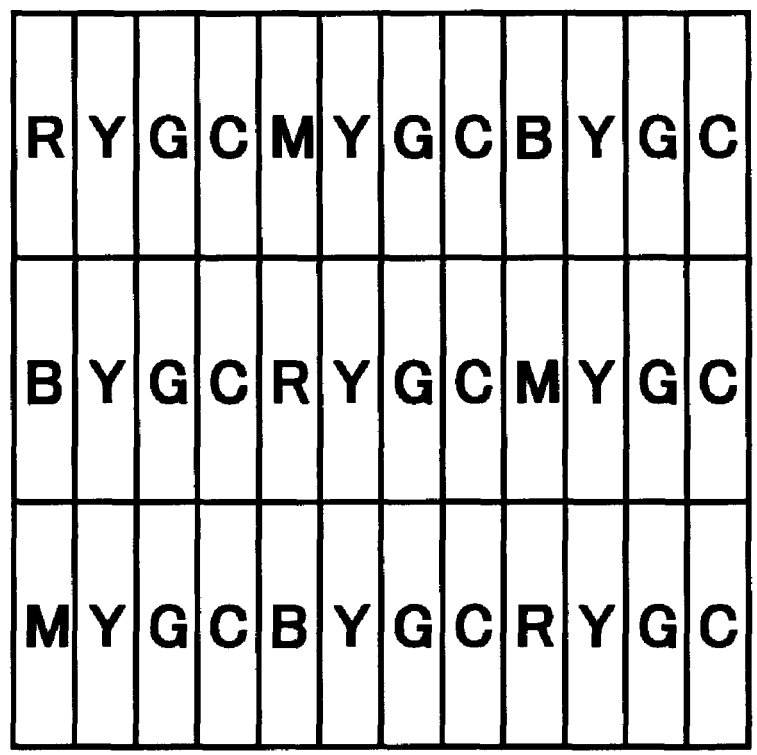
Figures 4, 11:
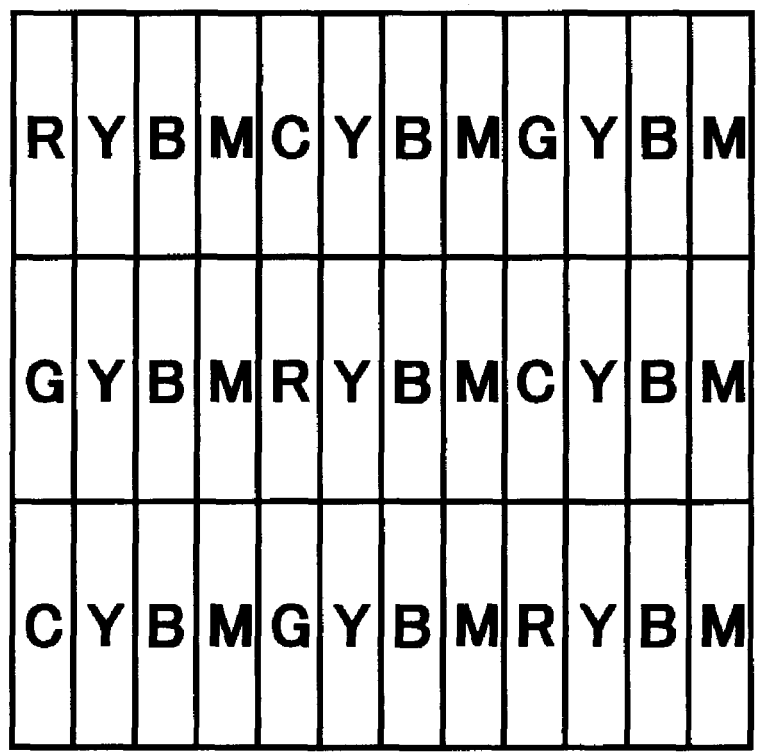
Figures 5, 11:
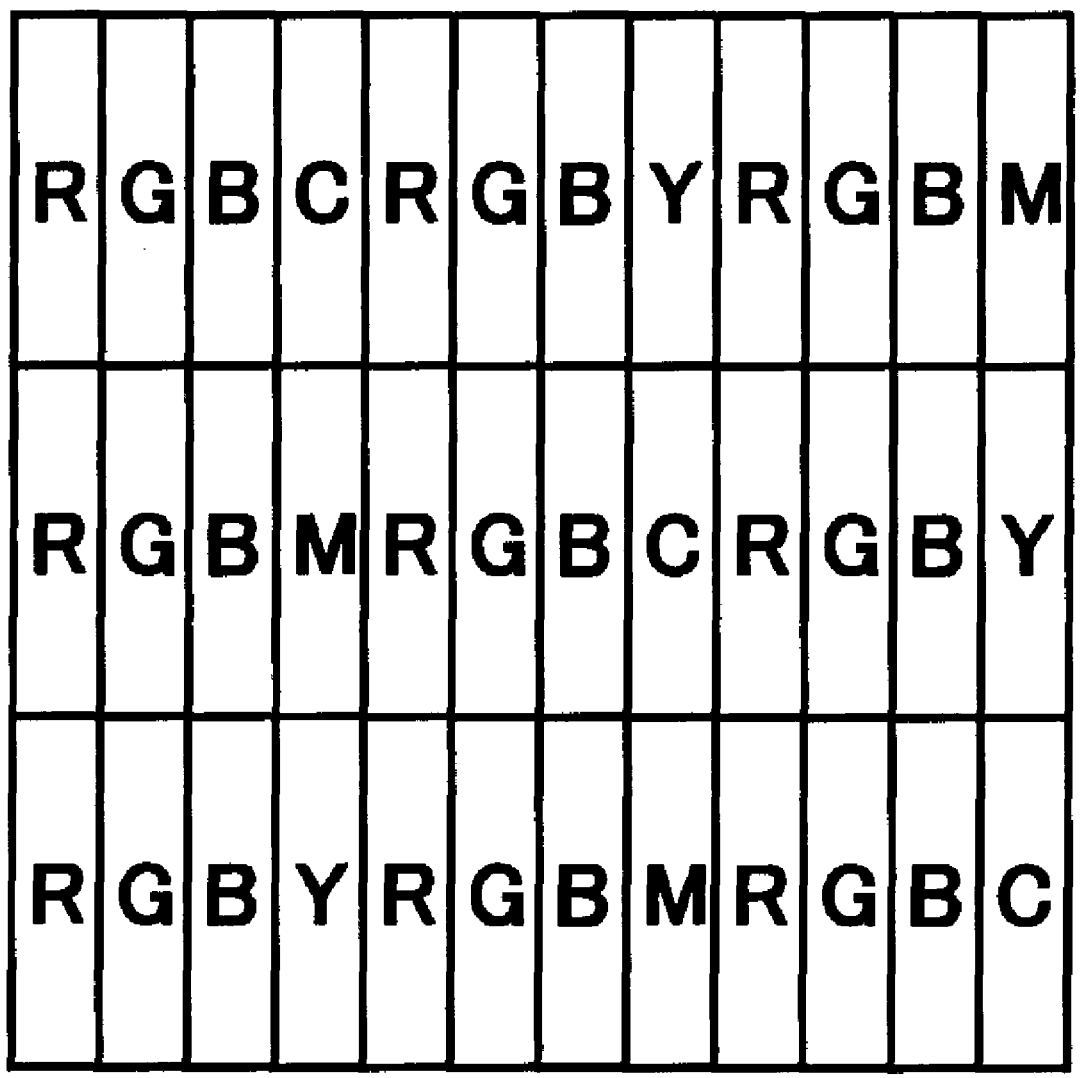
Figure 14:
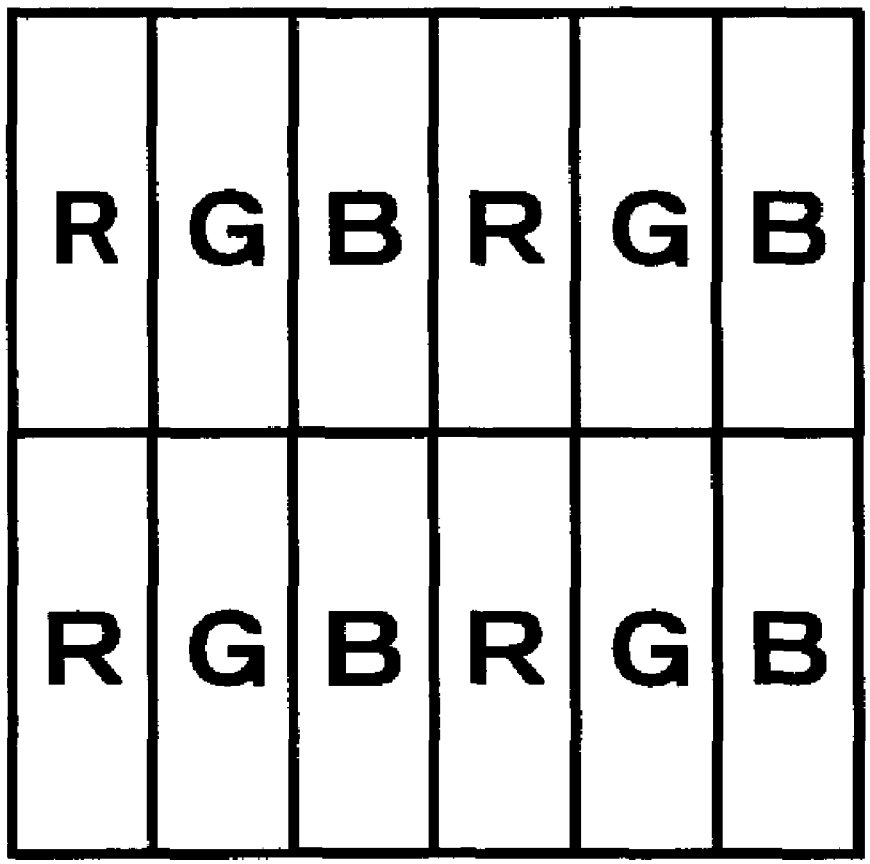
FIG. 14 shows a form of pixels constituting a conventional three-primary color (RGB) display device, and is a schematic view showing an array of three sub-pixels constituting one pixel.
Figure 15:
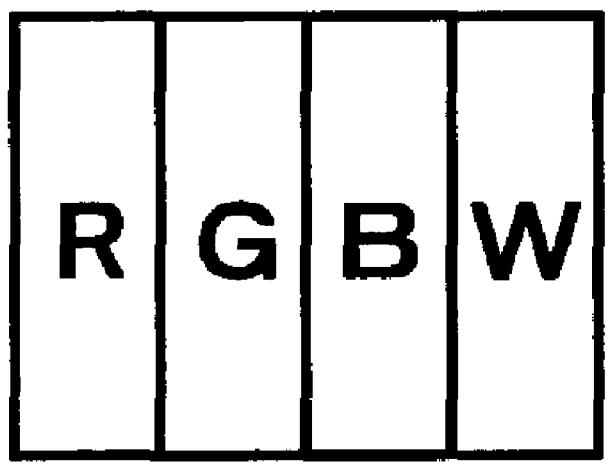
FIG. 15 shows a form of pixels constituting a conventional four-primary color (RGBW) display device, and is a schematic view showing an array of four sub-pixels constituting one pixel.

In the present embodiment, among patterns in which selected two colors (corresponding to 3 and 4 in FIG. 4) alternately included in the pixels and the other colors (corresponding to 1 and 2 in FIG. 4) are arranged in all of the pixels, visually excellent patterns are shown in FIGS. 5-1 to 5-3.

FIG. 5-1 is a schematic view showing an embodiment in which three sub-pixels constituting one pixel are arranged in order of RYG or BYG. In this display device, the array pixel of RYG and the array pixel of BYG are arranged alternately in row and column directions, i.e. in a lattice pattern. Y having the highest brightness value (Y value) is arranged in the central region of the pixel.

In this configuration, Y is not thinned, and R and G each having a brightness closest to the average brightness in the pixel are thinned.

FIG. 5-2 is a schematic view showing an embodiment in which three sub-pixels constituting one pixel are arranged in order of RYB or GYB. In this display device, the array pixel of RYB and the array pixel of GYB are arranged alternately in row and column directions, i.e. in a lattice pattern. Y having the highest brightness value (Y value) is arranged in the central region of the pixel.

In this configuration, Y is not thinned, and R and B having the smallest brightness ratio and the smallest difference in brightness are thinned.

FIG. 5-3 is a schematic view showing an embodiment in which three sub-pixels constituting one pixel are arranged in order of RYG or RYB. In this display device, the array pixel of RYG and the array pixel of RYB are arranged alternately in row and column directions, i.e. in a lattice pattern. Y having the highest brightness value (Y value) is arranged in the central region of the pixel.

In this configuration, Y and R are not thinned, and B and G are thinned.

Embodiment 3

In the present embodiment, a five-primary color display device in which sub-pixels of four colors are arranged in one pixel is mentioned.

FIGS. 6-1 and 6-2 each show pixels constituting a five-primary color display device in accordance with one embodiment of the present invention. Also, FIGS. 6-1 and 6-1 are schematic views each showing a sub-pixel arrangement configuration in the display device in which one pixel is constituted by sub-pixels of four colors among R, G, B, C, and Y, and the four sub-pixels are arranged in two rows and two columns. FIGS. 6-1 and 6-2 each show a repeating pattern of 2×2 pixels and in one pixel, the sub-pixels are arranged in two rows and two columns. With respect to the brightness (cd/m$^2$) of the sub-pixel of each color, R is 30, G is 70, B is 20, C is 60, and Y is 160. The average brightness (cd/m$^2$) of the pixel is 68 and colors closest and second-closest to this value are G and C.

In the present embodiment, among patterns in which selected two colors (corresponding to 4 and 5 in FIG. 6-1 or 6-2) alternately included in the pixels and the other colors (corresponding to 1 to 3 in FIG. 6-1 or 6-2) are arranged in all of the pixels, visually excellent patterns are shown in FIGS. 7-1 to 7-7.

FIG. 7-1 is a schematic view showing an embodiment in which four sub-pixels constituting one pixel are arranged in order of RYGB or RYCB. In this display device, the array pixel of RYGB and the array pixel of RYCB are arranged alternately in row and column directions, i.e. in a lattice pattern.

In this configuration, Y and R are not thinned, and G and C having the smallest brightness ratio and the smallest difference in brightness, and each having a brightness closest to the average value of the pixel are thinned.

FIG. 7-2 is a schematic view showing an embodiment in which four sub-pixels constituting one pixel are arranged in order of RYGC or RYBC. In this display device, the array pixel of RYGC and the array pixel of RYBC are arranged alternately in row and column directions, i.e. in a lattice pattern.

In this configuration, Y and R are not thinned, and G and B are thinned.

FIG. 7-3 is a schematic view showing an embodiment in which four sub-pixels constituting one pixel are arranged in order of RGBC or RGBY. In this display device, the array pixel of RGBC and the array pixel of RGBY are arranged alternately in row and column directions, i.e. in a lattice pattern.

In this configuration, R is not thinned, and C and Y are thinned.

FIG. 7-4 is a schematic view showing an embodiment in which four sub-pixels constituting one pixel are arranged in order of RYGB or RYCB. In this display device, the array pixel of RYGB and the array pixel of RYCB are arranged alternately in row and column directions, i.e. in a lattice pattern.

In this configuration, Y and R are not thinned, and C and G having the smallest brightness ratio and the smallest difference in brightness and each having a brightness closest to the average value of the pixel are thinned.

FIG. 7-5 is a schematic view showing an embodiment in which four sub-pixels constituting one pixel are arranged in order of RYGC or RYBC. In this display device, the array pixel of RYGC and the array pixel of RYBC are arranged alternately in row and column directions, i.e. in a lattice pattern.

In this configuration, Y and R are not thinned, and B and G are thinned.

FIG. 7-6 is a schematic view showing an embodiment in which four sub-pixels constituting one pixel are arranged in order of RYGB or RYCB. In this display device, the array pixel of RYGB and the array pixel of RYCB are arranged alternately in row and column directions, i.e. in a lattice pattern.

In this configuration, Y and R are not thinned, and C and G are thinned.

FIG. 7-7 is a schematic view showing an embodiment in which four sub-pixels constituting one pixel are arranged in order of RGBY or RGBC. In this display device, the array pixel of RGBY and the array pixel of RGBC are arranged alternately in row and column directions, i.e. in a lattice pattern.

In this configuration, R is not thinned, and C and Y are thinned.

Embodiment 4

In the present embodiment, a six-primary color display device in which sub-pixels of five colors are arranged in one pixel is mentioned.

Figure 8:
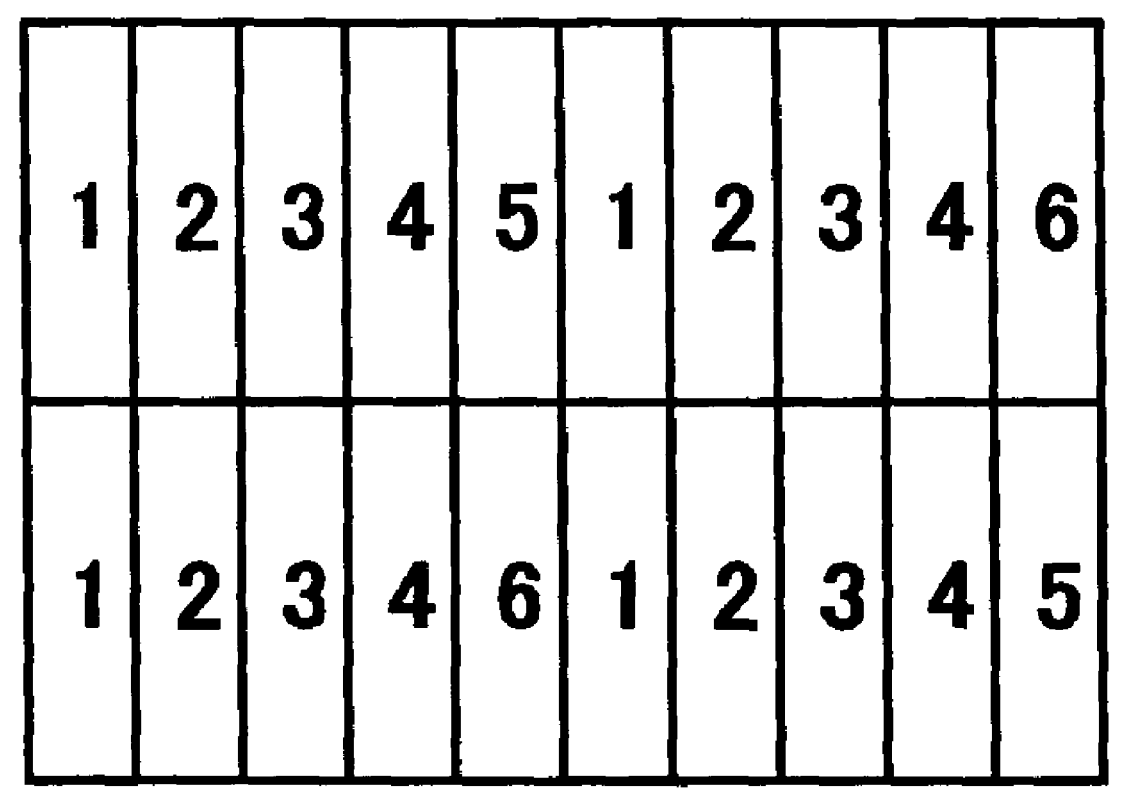

FIG. 8 shows pixels constituting a six-primary display device in accordance with one embodiment of the present invention. Also, FIG. 8 is a schematic view showing a sub-pixel arrangement configuration in a display device in which one pixel is constituted by sub-pixels of five colors among R, Y, G, C, B and M, and the five sub-pixels are arranged in a stripe pattern. In FIG. 8, a repeating pattern of 2×2 pixels is shown and in one pixel, the sub-pixels are arranged in a stripe pattern. With respect to the brightness (cd/m$^2$) of the sub-pixel of each color, R is 30, G is 70, B is 20, C is 60, M is 15, and Y is 160. The average brightness (cd/m$^2$) of the pixel is 59 and colors closest and second-closest to this value are C and G. The sub-pixel arrangement pattern is not especially limited, although the fifth or the sixth sub-pixel is arranged in an end of the pixel in FIG. 8.

In the present embodiment, among patterns in which selected two colors (corresponding to 5 and 6 in FIG. 8) alternately included in the pixels and the other colors (corresponding to 1 to 4 in FIG. 8) are arranged in all of the pixels, visually excellent patters are and shown in FIGS. 9-1 to 9-3.

FIG. 9-1 is a schematic view showing an embodiment in which five sub-pixels constituting one pixel are arranged in order of RYGCB or MYGCB. In this display device, the array pixel of RYGCB and the array pixel of MYGCB are arranged alternately in row and column directions, i.e. in a lattice pattern.

In this configuration, Y is not thinned, and R and M having the smallest difference in brightness are thinned.

FIG. 9-2 is a schematic view showing an embodiment in which five sub-pixels constituting one pixel are arranged in order of RYGBM or RYCBM. In this display device, the array pixel of RYGBM and the array pixel of RYCBM are arranged alternately in row and column directions, i.e. in a lattice pattern.

In this configuration, R and Y are not thinned, and G and C having the smallest brightness and each having a brightness closest to the average brightness in the pixel are thinned.

FIG. 9-3 is a schematic view showing an embodiment in which five sub-pixels constituting one pixel are arranged in order of RYGCB or RYGCM. In this display device, the array pixel of RYGCB and the array pixel of RYGCM are arranged alternately in row and column directions, i.e. in a lattice pattern.

In this configuration, Y and R are not thinned, but B and M are thinned.

Embodiment 5

In the present embodiment, a six-primary color display device in which sub-pixels of four colors are arranged in one pixel is mentioned.

FIGS. 10-1 to 10-3 each show pixels constituting a six-primary color display device in accordance with one embodiment of the present invention. Also, FIGS. 10-1 to 10-3 are schematic views each showing a sub-pixel arrangement configuration in the display device in which one pixel is constituted by sub-pixels of four colors among R, Y, G, C, B, and M, and the four sub-pixels are arranged in a stripe pattern. In FIGS. 10-1 to 10-3, a repeating pattern of 3×3 pixels is shown and in one pixel, the sub-pixels are arranged in a stripe pattern. With respect to the brightness (cd/m$^2$) of the sub-pixel of each color, R is 30, G is 70, B is 20, C is 60, M is 15, and Y is 160. The average brightness (cd/m$^2$) in the pixel is 59 and colors closest and second-closest to this value are C and G. The sub-pixel arrangement pattern is not especially limited, although the fourth to sixth sub-pixel is arranged in an end of the pixel in FIGS. 10-1 to 10-3.

In the present embodiment, among patterns in which selected three colors (corresponding to 4 to 6 in FIGS. 10-1 to 10-3) alternately included in the pixels and the other colors (corresponding to 1 to 3 in FIGS. 10-1 to 10-3) are arranged in all of the pixels, visually excellent patters are shown in FIGS. 11-1 to 11-5.

FIG. 11-1 is a schematic view showing an embodiment in which four sub-pixels constituting one pixel are arranged in order of RYGB, CYGB, or MYGB. In this display device, the array pixel of RYGB, the array pixel of CYGB, and the array pixel of MYGB are arranged alternately in row and column directions, i.e. in a lattice pattern.

In this configuration, Y is not thinned, and R, C, and M are thinned. Among them, the combination of R and M has the smallest difference in brightness.

FIG. 11-2 is a schematic view showing an embodiment in which four sub-pixels constituting one pixel are arranged in order of RGBC, RGBY, or RGBM. In this display device, the array pixel of RGBC, the array pixel of RGBY, and the array pixel of RGBM are arranged alternately in row and column directions, i.e. in a lattice pattern.

In this configuration, R is not thinned, and C, Y, and M are thinned.

FIG. 11-3 is a schematic view showing an embodiment in which four sub-pixels constituting one pixel are arranged in order of RYGC, MYGC, or BYGC. In this display device, the array pixel of RYGC, the array pixel of MYGC, and the array pixel of BYGC are arranged alternately in row and column directions, i.e. in a lattice pattern.

In this configuration, Y is not thinned, and R, M, and B are thinned. Among them, the combination of R and M has the smallest difference in brightness.

FIG. 11-4 is a schematic view showing an embodiment in which four sub-pixels constituting one pixel are arranged in order of RYBM, CYBM, or GYBM. In this display device, the array pixel of RYBM, the array pixel of CYBM, and the array pixel of GYBM are arranged alternately in row and column directions, i.e. in a lattice pattern.

In this configuration, Y is not thinned, and R, C, and G are thinned. Among them, the combination of C and G has the smallest brightness ratio and has a brightness closest to the average brightness in the pixel.

FIG. 11-5 is a schematic view showing an embodiment in which four sub-pixels constituting one pixel are arranged in order of RGBC, RGBY, or RGBM. In this display device, the array pixel of RGBC, the array pixel of RGBY, and the array pixel of RGBM are arranged alternately in row and column directions, i.e. in a lattice pattern.

In this configuration, R is not thinned, and C, Y, and M are thinned.

Embodiment 6

In the present embodiment, a six-primary color display device in which sub-pixels of four colors are arranged in one pixel is mentioned.

FIGS. 12-1 and 12-2 each show pixels constituting a six-primary color display device in accordance with one embodiment of the present invention. Also, FIGS. 12-1 and 12-2 are schematic views each showing a sub-pixel arrangement configuration in the display device in which one pixel is constituted by sub-pixels of four colors among R, Y, G, C, B, and M, and the four sub-pixels are arranged in two rows and two columns. In FIGS. 12-1 and 12-2, a repeating pattern of 3×3 pixels is shown and in one pixel, the sub-pixels are arranged in two rows and two columns. With respect to the brightness (cd/m$^2$) of the sub-pixel of each color, R is 30, G is 70, B is 20, C is 60, M is 15, and Y is 160. The average brightness (cd/m$^2$) of the pixel is 59 and colors closest and second-closest to this value are G and C.

In the present embodiment, among patterns in which selected three colors alternately included in the pixels (corresponding to 4 to 6 in FIG. 12-1 or 12-2) alternately included in the pixels and the other colors (corresponding to 1 to 3 in FIG. 12-1 or 12-2) are arranged in all of the pixels, visually excellent patters are shown in FIGS. 13-1 to 13-4.

FIG. 13-1 is a schematic view showing an embodiment in which four sub-pixels constituting one pixel are arranged in order of RGBC, RGBY, or RGBM. In this display device, the array pixel of RGBC, the array pixel of RGBY, and the array pixel of RGBM are arranged alternately in row and column directions, i.e. in a lattice pattern.

In this configuration, R is not thinned, and C, Y, and M are thinned.

FIG. 13-2 is a schematic view showing an embodiment in which four sub-pixels constituting one pixel are arranged in order of RGBY, MGBY, or CGBY. In this display device, the array pixel of RGBY, the array pixel of MGBY, and the array pixel of CGBY are arranged alternately in row and column directions, i.e. in a lattice pattern.

In this configuration, Y is not thinned, and R, M, and C are thinned. Among them, the combination of R and M has the smallest difference in brightness.

FIG. 13-3 is a schematic view showing an embodiment in which four sub-pixels constituting one pixel are arranged in order of RGCY, MGCY, or BGCY. In this display device, the array pixel of RGCY, the array pixel of MGCY, and the array pixel of BGCY are arranged alternately in row and column directions, i.e. in a lattice pattern.

In this configuration, Y is not thinned, and R, M, and B are thinned. Among them, the combination of R and M has the smallest difference in brightness.

FIG. 13-4 is a schematic view showing an embodiment in which four sub-pixels constituting one pixel are arranged in order of RYMB, CYMB, or GYMB. In this display device, the array pixel of RYMB, the array pixel of CYMB, and the array pixel of GYMB are arranged alternately in row and column directions, i.e. in a lattice pattern.

In this configuration, Y is not thinned, and R. C, and G are thinned. Among them, the combination of C and G has the smallest brightness ratio and has a brightness closest to the average brightness in the pixel.

The display devices in accordance with Embodiments 1 to 6 are display devices in which an image is constituted by a plurality of pixels and display is performed using multi-primary colors. Such display devices can be widely used for color display technology in multi-primary color display devices in which one pixel is constituted by a plurality of sub-pixels (picture elements), and can be preferably used for liquid crystal display devices such as a liquid crystal TV, and various displays such as a PDP, an organic EL, and a FED, for example. Among them, the display devices having the configuration according to embodiments 1 to 4 can provide particularly excellent display quality.

This Nonprovisional application claims priority under 35 U.S.C. §119(a) on Patent Application No. 2004-240021 filed in Japan on Aug. 19, 2004, the entire contents of which are hereby incorporated by reference.

The invention claimed is:

1. A display device arranged to display an image constituted by pixels each including sub-pixels of primary colors of n colors (n representing an integer of 4 or more),
wherein each of the pixels includes sub-pixels of m colors (m representing an integer of 3 or more, m<n), and sub-pixels of (n−m+1) colors among the n colors are included in one out of every (n−m+1) pixels; and the one out of every (n−m+1) pixels includes at least one different colored sub-pixel than remaining ones of the pixels.

2. The display device according to claim 1,
wherein sub-pixels of (n−m+1) colors having a small brightness ratio and/or a small difference in brightness among the n colors are included in one out of every (n−m+1) pixels.

3. The display device according to claim 1,
wherein the pixels constituting the display device mainly include a pixel including a yellow (Y) sub-pixel.

4. The display device according to claim 3,
wherein the yellow (Y) sub-pixel is arranged in a central region of the pixel.

5. The display device according to claim 1,
wherein the pixels constituting the display device mainly include a pixel including a red (R) sub-pixel.

6. The display device according to claim 1,
wherein a sub-pixel of a color having a brightness closest to an average brightness in the pixel among the n colors is included in one out of every (n−m+1) pixels.

7. The display device according to claim 1,
wherein the sub-pixels constituting the pixel are arranged in a stripe pattern.

8. The display device according to claim 1,
wherein (n−m+1) or more different sub-pixel arrays are arranged in a lattice pattern.

9. The display device according to claim 1,
wherein the display device is arranged to display an image using five primary colors of red (R), green (G), blue (B), yellow (Y), and cyan (C),
each of the pixels constituting the display device includes sub-pixels of four colors, and
cyan (C) and green (G) are included in one out of every two pixels.

10. The display device according to claim 9,
wherein a pixel including cyan (C) and a pixel including green (G) are adjacently arranged.

11. The display device according to claim 9,
wherein each of the pixels constituting the display device includes sub-pixels arranged in a stripe pattern in order of red (R), yellow (Y), cyan (C), blue (B), or in order of red (R), yellow (Y), green (G), blue (B).

12. A liquid crystal display device comprising the display device of claim 1.

* * * * *